July 23, 1957     G. H. KOHTZ     2,799,907
COIL END HOLDER FOR HOSE
Filed Sept. 4, 1953

INVENTOR.
GEORGE H. KOHTZ
BY
McMorrow, Berman & Davidson
ATTORNEYS

2,799,907
COIL END HOLDER FOR HOSE
George H. Kohtz, Peoria, Ill.

Application September 4, 1953, Serial No. 378,598

1 Claim. (Cl. 24—81)

This invention relates to a device for holding the coiled end of a garden hose or other hose in coiled position, and the primary object of the invention is to provide practical and efficient means whereby the first coil made in coiling or winding up a hose can be positively maintained so that kinking of the hose and dropping away of the end of the hose in the course of winding or unwinding the hose, which are otherwise likely to occur, are prevented from taking place.

Another important object of the invention is to provide a device of the character indicated above which is easy to apply to a hose, which is simple in construction, and which can be made in a rugged and serviceable form at relatively low cost.

Other important objects and advantageous features of the invention will be apparent from the following description and the accompanying drawing, wherein, for purposes of illustration only, a specific embodiment of the invention is set forth in detail.

Figure 1:
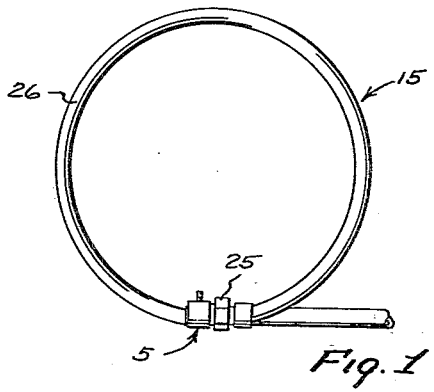
Figure 1 is a fragmentary side elevation, showing application of a device according to the present invention to an end coil of a hose.
Figure 2:
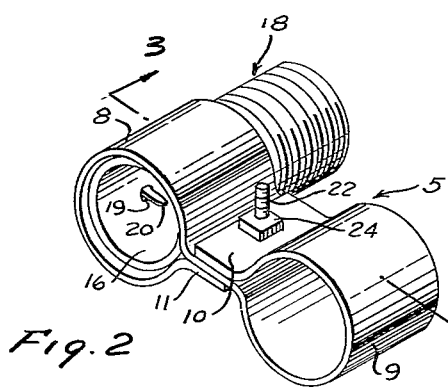
Figure 2 is an enlarged perspective view of the device in assembled condition.
Figure 3:
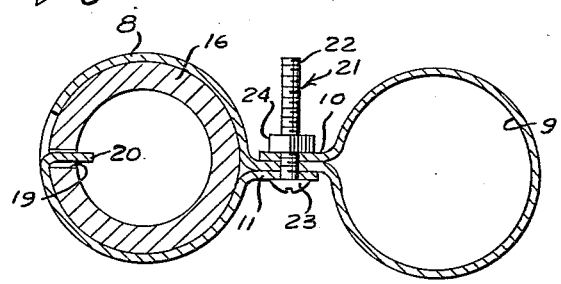
Figure 3 is a transverse section taken on the line 3—3 of Figure 2.
Figure 4:
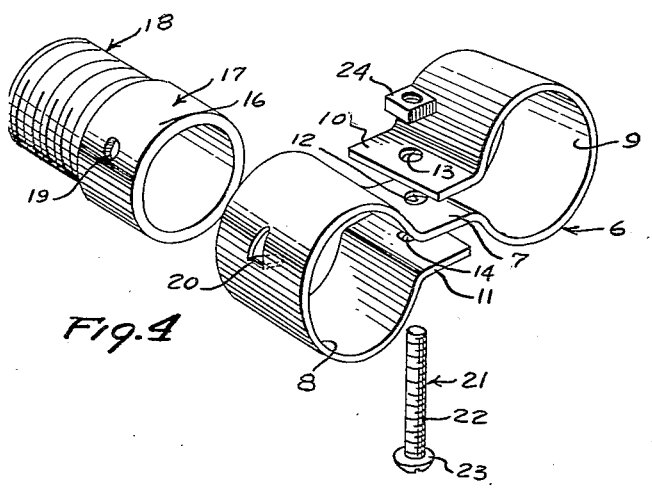
Figure 4 is an exploded perspective view of the device.

Referring in detail to the drawings, wherein like numerals designate like parts throughout the several views, the numeral 5 generally designates the illustrated device, which comprises a clamp body 6 of figure-eight contour made of flat strip material, preferably spring metal. The clamp body 6 has a flat central web 7 from whose opposite ends extend circular loops 8 and 9, respectively, having free ends terminating in radial flat ears 10 and 11, respectively. The web 7 and the ears 10 and 11 have bolt holes 12, 13 and 14, respectively. The ears 10 and 11 are located at opposite sides of the web 7 and are coextensive therewith, with the bolt holes 12, 13 and 14 registered.

The loop 9 is of a diameter to snugly receive a garden hose 15 therethrough and secure the hose when the clamp body 6 is tightened. The ear 10 of the hose loop 9 overlies the web 7, while the ear 11 of the nipple holding loop 8 is beneath the web 7. The nipple holding loop 8 is of a diameter to snugly accommodate the smooth part 16 of a hose nipple 17 having threaded end portion 18.

The nipple 17 is provided in its smooth part 16 with a radial hole 19, and the nipple holding loop 8 has a cut out tongue 20 extending radially inwardly thereof and engageable in the nipple hole 19 so as to retain the nipple 17 in the loop 8.

A clamping bolt 21 has a shank 22 which passes through the registered holes 12, 13 and 14 in the clamp body web and the ears 10 and 11, a head 23 to engage the outer side of one of the ears, and a nut 24 to engage the outer side of the other ear, and to compress the ears and web together to constrict the loop 8 on the nipple 17 and the loop 9 on the hose 15.

In installing the device 5, the clamp body being uncompressed and the bolt 21 loosened, the end of the hose 15 with its female connector or spanner nut 25 is passed through the loop 9 until the loop 9 is about five or six feet from the female connector 25. Thereupon the bolt 21 is tightened so as to hold the loop 9 in place on the hose 15. The part of the hose between the female connector 25 and the loop 9 is then coiled to provide a single convolution 26, and the female connector is then screwed onto the threaded end portion of the nipple 17.

With the convolution 26 thus held against kinking or becoming unwound, and the end of the hose equipped with the female connector 25 positively prevented from coming loose, the hose 15 can be confidently and speedily wound or unwound.

What is claimed is:

A device for holding a hose coil having a spanner nut at one end thereof, comprising: a strip of spring metal formed with a planiform, apertured web medially between its ends, a pair of loops respectively extending through substantially 360 degrees of a circle from the opposite ends of the web, ears on the other ends of the loops respectively overlying the web, the loops being tensioned to normally open the same and urge the ears outwardly from the web, the ears having apertures registering with those of the web, and a tongue projecting radially inwardly of one of the loops; means extending through the apertures of the ears and web releasably holding the ears flat against the web with the loops resiliently and yieldably biased to closed positions, the other loop being adapted to slidably receive the other end of the coil in the open condition of said other loop and being further adapted to clampably engage said other end of the coil when said other loop is closed; and a nipple removably engaged in said one loop and having a smooth-surfaced end portion about which said one loop extends, the nipple having a threaded end portion projecting axially of and beyond said one loop to engage the spanner nut and thereby permit connection of said one coil end to the coil holding device, responsive to rotation of the nut with said one coil end axially aligned with the nipple, the first end portion of the nipple having a radial opening receiving the tongue in both the closed and open positions of said one loop to hold the nipple against rotation during threading of the nut along the second end portion.

References Cited in the file of this patent

UNITED STATES PATENTS

| | | |
|---|---|---|
| 978,398 | Rischard | Dec. 13, 1910 |
| 1,519,018 | Boudreau | Dec. 9, 1924 |
| 1,760,323 | Shelton | May 27, 1930 |
| 1,816,301 | Sundell | July 28, 1931 |
| 2,011,521 | Lorenz | Aug. 13, 1935 |
| 2,012,562 | Gunn | Aug. 27, 1935 |
| 2,058,416 | Comstock | Oct. 27, 1936 |
| 2,651,026 | Roth | Sept. 1, 1953 |